United States Patent
Topps et al.

(10) Patent No.: US 10,694,681 B2
(45) Date of Patent: Jun. 30, 2020

(54) CLOSED APPARATUS FOR IRRADIATING PLANTS AND PRODUCE

(71) Applicants: Ryan Joseph Topps, Nesconset, NY (US); Barbara Jean Wilk, Nesconset, NY (US)

(72) Inventors: Ryan Joseph Topps, Nesconset, NY (US); Barbara Jean Wilk, Nesconset, NY (US)

(*) Notice: Subject to any disclaimer, the term of this patent is extended or adjusted under 35 U.S.C. 154(b) by 181 days.

(21) Appl. No.: 15/455,021

(22) Filed: Mar. 9, 2017

(65) Prior Publication Data
US 2018/0255709 A1 Sep. 13, 2018

(51) Int. Cl.
- *A01G 7/04* (2006.01)
- *H05B 37/02* (2006.01)
- *A01C 1/00* (2006.01)

(52) U.S. Cl.
CPC ............... *A01G 7/045* (2013.01); *A01C 1/00* (2013.01); *H05B 37/0227* (2013.01); *H05B 37/0281* (2013.01); *Y02P 60/146* (2015.11)

(58) Field of Classification Search
CPC ........ A01G 7/045; A01G 9/249; A61L 2/0047
See application file for complete search history.

(56) References Cited

U.S. PATENT DOCUMENTS

| | | | |
|---|---|---|---|
| 4,877,964 A * | 10/1989 | Tanaka | A23L 3/28 250/455.11 |
| 5,040,329 A | 8/1991 | Michaloski | |
| 8,689,461 B1 * | 4/2014 | Cookson | F26B 3/205 34/403 |
| 9,050,383 B2 * | 6/2015 | Gray | A61L 2/18 |
| 9,295,741 B2 * | 3/2016 | Yerby | A61L 2/10 |
| 2005/0152143 A1 * | 7/2005 | Lee | A01G 7/045 362/249.01 |
| 2008/0148630 A1 * | 6/2008 | Ryan | A01G 7/045 47/17 |
| 2009/0272029 A1 | 11/2009 | Aiking et al. | |
| 2010/0148090 A1 * | 6/2010 | Chang | A61L 2/10 250/455.11 |
| 2010/0281771 A1 * | 11/2010 | Kudo | A01G 7/045 47/58.1 LS |
| 2011/0016785 A1 | 1/2011 | Yamada et al. | |
| 2013/0129567 A1 * | 5/2013 | Gray | A61L 2/18 422/29 |

(Continued)

OTHER PUBLICATIONS

Stevens et al.; Integration of Ultraviolet (UV-C) Light with Yeast Treatment for Control of Postharvest Storage Rots of Fruits and Vegetables; 1997; Academic Press; Bioglogical Control; 10, 98-103. (Year: 1997).*

(Continued)

*Primary Examiner* — Monica L Williams
*Assistant Examiner* — Michael A. Fabula
(74) *Attorney, Agent, or Firm* — Lousie S. Heim

(57) ABSTRACT

An apparatus for treating plant diseases and infestations includes a closed receptacle configured to contain a plant and/or produce, and at least one ultraviolet light source mounted in the receptacle and configured to direct ultraviolet light at the plant. The receptacle is provided with latches and position sensors that prevent the ultraviolet source from being activated if the receptacle is open or is not securely supported on a surface.

10 Claims, 5 Drawing Sheets

(56) References Cited

U.S. PATENT DOCUMENTS

| | | | | |
|---|---|---|---|---|
| 2013/0256560 A1* | 10/2013 | Yerby | ............ | A61L 2/10 250/455.11 |
| 2014/0157619 A1* | 6/2014 | Cookson | ............ | F26B 5/16 34/245 |
| 2014/0165462 A1* | 6/2014 | Shigyo | ............ | A01G 33/00 47/58.1 LS |
| 2015/0297767 A1* | 10/2015 | Gaska | ............ | A61N 5/0601 250/372 |
| 2015/0313090 A1* | 11/2015 | Weiss | ............ | A01G 7/045 250/453.11 |
| 2015/0342125 A1* | 12/2015 | Krijn | ............ | A01G 7/045 315/152 |
| 2016/0088804 A1* | 3/2016 | Ooi | ............ | A01G 22/00 47/17 |
| 2016/0205739 A1* | 7/2016 | Grajcar | ............ | H05B 33/0845 315/210 |
| 2017/0100496 A1* | 4/2017 | Shur | ............ | A23L 3/003 |
| 2018/0021471 A1* | 1/2018 | Krosney | ............ | A61F 7/0085 422/4 |
| 2018/0104368 A1* | 4/2018 | Dobrinsky | ............ | A61L 2/10 |
| 2018/0110890 A1* | 4/2018 | Matsui | ............ | A61L 2/10 |
| 2018/0242539 A1* | 8/2018 | Bhattacharya | ............ | A01G 7/045 |
| 2018/0359931 A1* | 12/2018 | Millar | ............ | G06K 9/00 |
| 2018/0359944 A1* | 12/2018 | Millar | ............ | H05B 33/0872 |
| 2019/0099509 A1* | 4/2019 | Martz | ............ | A61L 2/10 |
| 2019/0262484 A1* | 8/2019 | Georgeson | ............ | A61L 2/0047 |

OTHER PUBLICATIONS

Wilson et al.; Using an On-line UV-C Apparatus to Treat Harvested Fruit for Controlling Postharvest Decay; 1997; HortTechnology; Jul.-Sep. 1997 7(3) 278-281. (Year: 1997).*

* cited by examiner

CLOSED APPARATUS FOR IRRADIATING PLANTS AND PRODUCE

TECHNICAL FIELD

The present disclosure relates in general to horticulture and more particularly to devices for treating plant diseases and infestations.

BACKGROUND

Ultraviolet radiation, in particular ultraviolet radiation in the wavelength range of 100 to 280 nm, also known as UV-C light, has been shown to be effective in killing plant diseases and infestations without damaging the plants themselves. Thus, various attempts have been made to design ultraviolet lighting devices for treating crops. One such device, described in U.S. Pat. No. 5,040,329 to Michaloski et al., comprises an array of ultraviolet lights mounted on a support frame pulled by a vehicle such as a tractor. Another device, described in patent application publication number US 2009/0272029 A1 to Aiking et al., includes one or more ultraviolet lights that are placed on a trolley or conveyor belt passing by a plant, plant part, or mushrooms. Yet another device, described in patent application publication number US 2011/0016785, includes stationary UV and visible light sources and a controller that controls the UV and visible light sources to produce an irradiation pattern.

Unfortunately, direct exposure to UV-C light can cause serious injury to the user and others nearby. Health problems, such as burns to the eyes and skin, are likely without safety protection. None of the above-mentioned open devices include protective features for preventing an operator or bystander from such exposure while a plant and its produce is being treated. Accordingly, operators of the mentioned devices typically must wear cumbersome protective clothing and eyewear when irradiating crops. This and other problems are addressed by the present disclosure as summarized below.

SUMMARY

An apparatus for irradiating plants and produce includes a closed receptacle configured in any shape or size to contain a plant and/or produce, and at least one ultraviolet light source mounted in the receptacle and configured to direct ultraviolet light at the plant and/or produce. The ultraviolet light sources preferably emit ultraviolet rays in the UV-C range. In addition, the apparatus may include a blower or fan for moving or agitating the plant and its produce.

The receptacle may include a sidewall or multiple sidewalls configured to extend completely around the plant, as well as a solid top wall configured to prevent light from exiting the receptacle. The inner surface of the receptacle is reflective. In one embodiment, the side wall(s) of the apparatus is solid, and the bottom is open, allowing the receptacle to be conveyed and placed directly over the plant. In another embodiment, the bottom is solid, and the side wall(s) includes a door configured to allow access into the interior of the receptacle. In yet another embodiment, the receptacle comprises two half-shells connected by a hinge. In the embodiment with the door, a safety latch is provided to lock the door. In the two-piece embodiment, a safety latch is provided for locking the shells together in a closed position. In still another embodiment, the side wall(s) includes two doors allowing conveyance of plants and produce in and out of the apparatus.

In one aspect of the invention, a controller is coupled to the receptacle. The controller may include a timer switch coupled to the ultraviolet source and configured to energize the light source for a predetermined amount of time. A selector may be provided for setting the predetermined amount of time. The timer switch may also be coupled to the latch, so that the latch automatically closes when the ultraviolet light source is turned on and opens when the ultraviolet light source is turned off. The controller may also include sensors for detecting the position of the receptacle on a surface and the position of the door or the half-shells. An interlock switch connected to the sensors prevents the light source from being activated when the receptacle is not firmly supported on the surface and/or the door is not shut, or the two half-shells are not securely latched together. The controller may also include a current sensor for detecting whether the ultraviolet light source is operational. Treatment with UV-C radiation can only be delivered when the apparatus doors are sealed and/or an open-bottom unit is level. A safety off feature is present for the open bottom unit to turn the UV-C light off if the apparatus is tipped.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
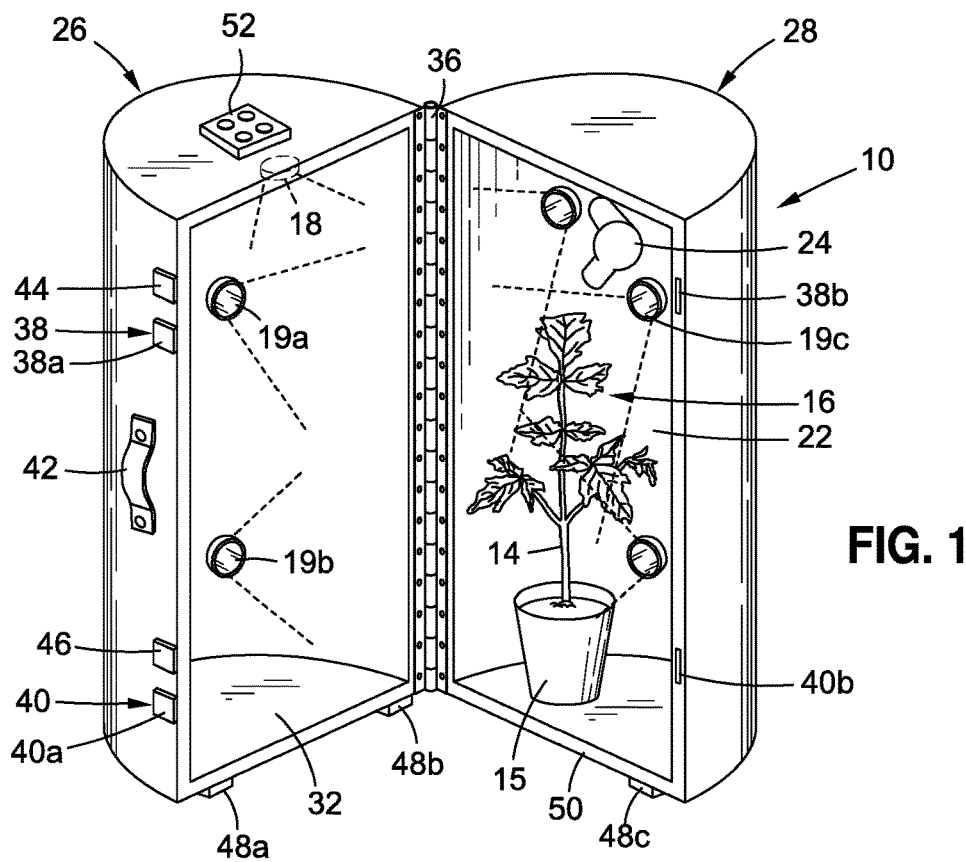
FIG. 1 is a perspective view showing an apparatus according to the present disclosure in an open position.
Figure 2:
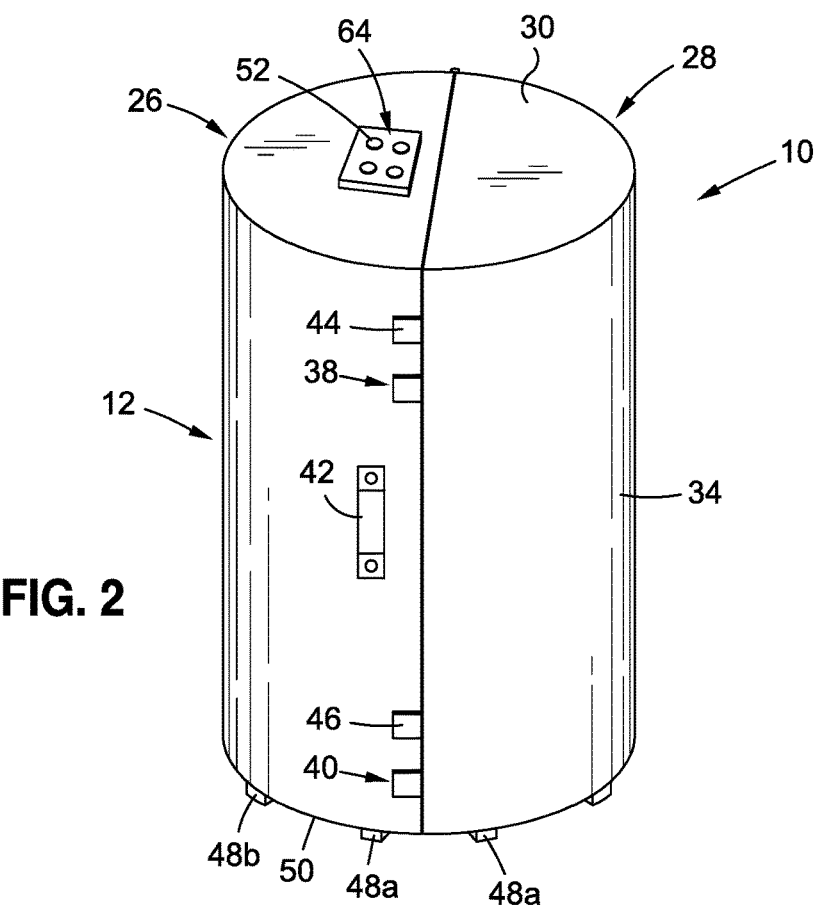
FIG. 2 is a perspective view of the apparatus of FIG. 1 in a closed position.

Turning now to the drawings, in which like numerals indicate corresponding elements throughout the several views, attention is first directed to FIG. 1, which shows an apparatus according to the present disclosure, indicated in its entirety by the numeral 10, in an open position, and to FIG. 2, which shows the apparatus 10 in a closed position.

The apparatus 10 includes a receptacle 12 configured to contain a plant 14 in a pot or planted 15. The receptacle 12 may be any size, depending on the size of plant and/or produce to be treated. For instance, a relatively small version of the receptacle 12 may be constructed for treating indoor houseplants, or a very large version may be constructed for treating outdoor trees or bushes. The receptacle 12 may be made of any material, provided the interior surface 16 of the receptacle is capable of effectively reflecting ultraviolet light and preventing escape of UV-C radiation. The plant 14 may be known to be infected with a disease or infested with insects or parasites, or it may appear to be free of disease or infestation. In other words, the device 10 may be used either for treating diseases and infestations or for prophylactic purposes by inhibiting pathogens before they develop into disease or infestations.

A single or plurality of ultraviolet light sources 18, 19*a, b, c* is mounted within the receptacle 12. The ultraviolet light sources 18, 19*a, b, c* preferably emit ultraviolet radiation in the UV-C range; i.e., radiation in the wavelength range of 100 to 280 nm. In the illustrated embodiment, several ultraviolet light sources 18 are mounted on the inner top surface of the receptacle 12, and several more ultraviolet light sources 19*a, b, c* are arranged within the inner side surface 22 of the receptacle. However, the number, power and position of ultraviolet sources may vary, depending on the size of the receptacle 12. In the case of a small receptacle for treating houseplants, a single ultraviolet source 18 mounted on the inner top surface may suffice. The light source or sources may be either LED, incandescent bulbs, or gaseous (fluorescent) type lamps, provided they can emit the desired wavelength.

A blower or fan 24 may be mounted on the inner top surface or elsewhere in the receptacle. The blower directs moving air at the leaves and other portions of the plant 14, causing the leaves and other portions to move so that the entire plant is evenly exposed to the ultraviolet radiation. Among other things, this prevents any one portion from getting over-irradiation during treatment.

The receptacle 12 comprises two half-shells 26, 28, each including a solid top wall 30, a solid bottom end 32, and a side wall 34, which is shown here to be semi-cylindrical, but could also have other shapes. The half-shells 26, 28 are connected by a longitudinally extending hinge 36. On the side of the receptacle 12 opposite the hinge 36 is a latching mechanism comprising an upper electromagnetic or mechanical lock 38 and a lower electromagnetic or mechanical lock 40. Each electromagnetic lock 38, 40 may comprise a first magnetic element 38*a*, 40*a* mounted on or in one of the shells 26, and a second magnetic element 38*b*, 40*b* mounted on or in the other shell 28. The first magnetic element 38*a*, 40*a* may have a fixed polarity, and the second magnetic element 40*a*, 40*b* may have a reversible polarity. When the polarity of the second magnetic element 38*b*, 40*b* is opposite the polarity of the first magnetic element 38*a*, 40*a*, an attractive force will be generated, locking the two half-shells 26, 28 together, but when the polarity of the second magnetic element 38*b*, 40*b* is reversed, a repellent force will be generated, pushing the half-shells 26, 28 apart. All embodiments of the apparatus will have a wired relay monitoring the position of the door(s) or unit halves.

A handle 42 may be provided on one or both half-shells 26, 28 or in any other position to facilitate opening and closing of the receptacle 12. In addition, the receptacle may be provided with several position sensors, including an upper shell position sensor 44, a lower shell position sensor 46, and a plurality of receptacle position sensors 48*a, b, c*. The shell position sensors 44, 46 detect whether the half-shells 26, 28 are tightly locked together, while the receptacle position sensors 48*a, b, c* mounted on or embedded in the bottom edge 50 of the receptacle 12 detect whether the receptacle 12 is firmly and stably supported on a flat surface. A controller 52 mounted on the top wall 30 of the receptacle allows an operator to activate the ultraviolet sources 18, 19*a, b, c*, the electromagnetic locks 38, 40, and/or other components of the apparatus 10.

Figure 3:
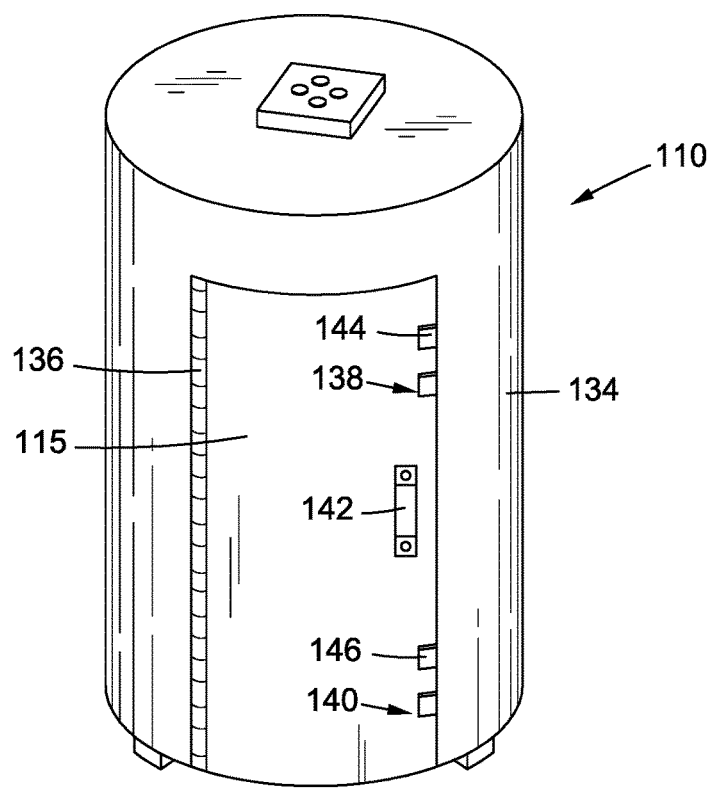
FIG. 3 is a perspective view of an apparatus according to an alternate embodiment of the disclosure.

An alternate embodiment of the invention, illustrated in FIG. 3 in its entirety by the numeral 110, includes a unitary, rather than two-piece, receptacle 114 having a door 115 formed in its sidewall 134. The door 115 includes a hinge 136, a handle 142, electromagnetic or mechanical locks 138, 140, and door position sensors 144, 146. The electromagnetic or mechanical locks 138, 140 are identical in function to the electromagnetic or mechanical locks 38, 40 of the first embodiment, and the door position sensors 144, 146 are similar or identical in function to the shell position sensors 44, 46 of the first embodiment.

Figure 4:
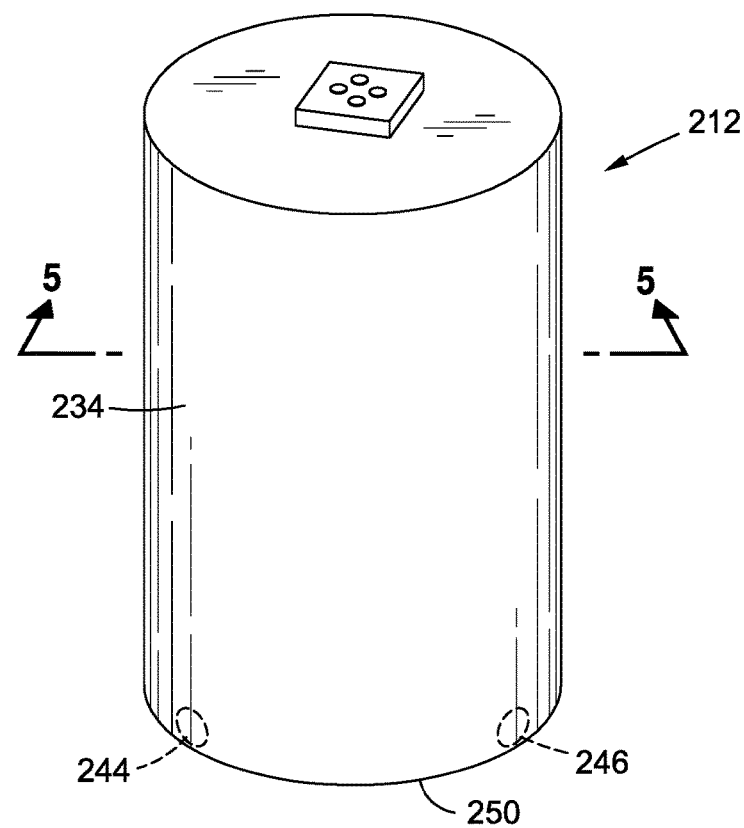
FIG. 4 is a perspective view of an apparatus according to yet another embodiment of the disclosure.
Figure 5:
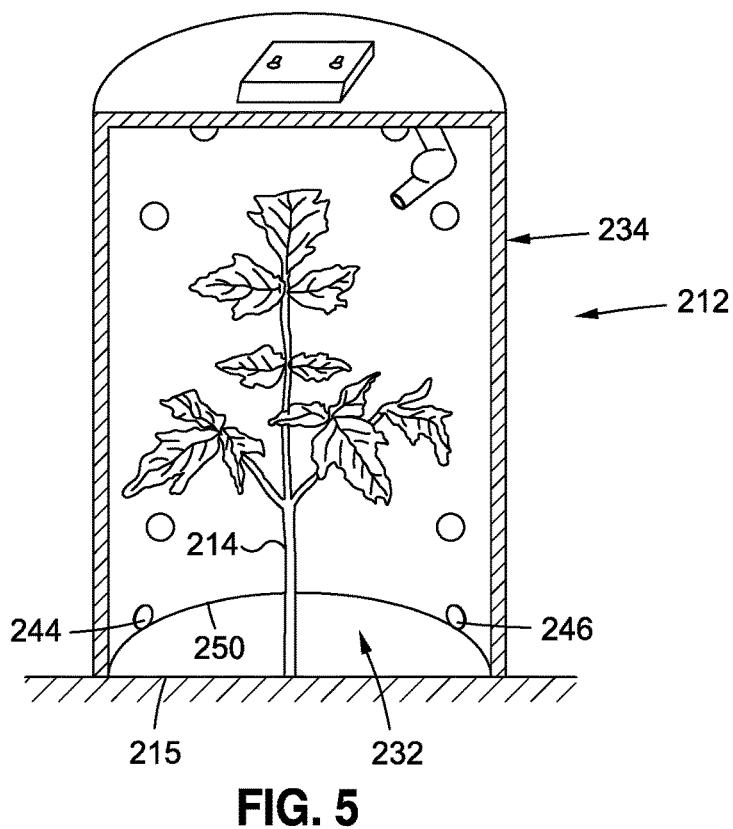
FIG. 5 is a view taken through line 5-5 of FIG. 4.

FIGS. 4 and 5 show another embodiment of the invention, designed for use with plants or produce, wherein the receptacle 212 includes an open bottom 232 and a single, one-piece side wall 134 having no doors or other openings. The open bottom 232 allows the receptacle 212 to be conveyed and placed directly over a plant growing in the ground 215, but does not allow ultraviolet light to escape, because the position sensors 244, 246 in the bottom edge 250 ensure that the bottom edge 250 is flush with the ground, essentially sealing in the light.

Figure 6:
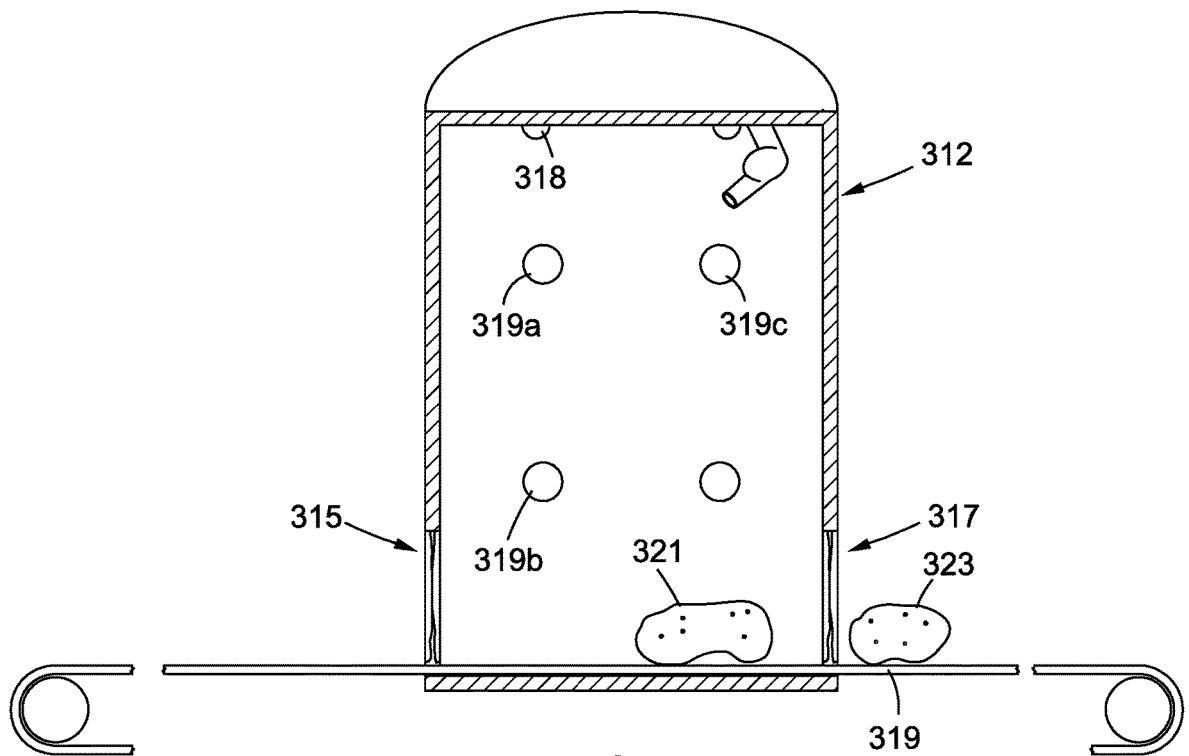
FIG. 6 is a sectional view of an apparatus according to still another embodiment of the disclosure

FIG. 6 shows yet another embodiment of the invention wherein the receptacle 312 includes both an entrance door 315 and an exit door 317, allowing a conveyor belt 319 to transport plants or produce, such as potatoes 321, in and out of the receptacle 312. In the case of produce, the conveyor belt might be porous and/or agitated to allow all sides to be treated. Each door 315, 317 includes a latching mechanism similar to the latching mechanisms disclosed in the previous embodiments. A timer circuit may be operated to open the doors 315, 317 while the conveyor belt 319 is advanced sufficiently to allow a single amount of produce 321 to enter the receptacle 312, then to close and latch the doors 315 while the ultraviolet lights 318, 319*a, b, c* are activated, and then to reopen to allow the irradiated produce item 321 to exit and a non-irradiated item 323 to enter the receptacle.

Figure 7:
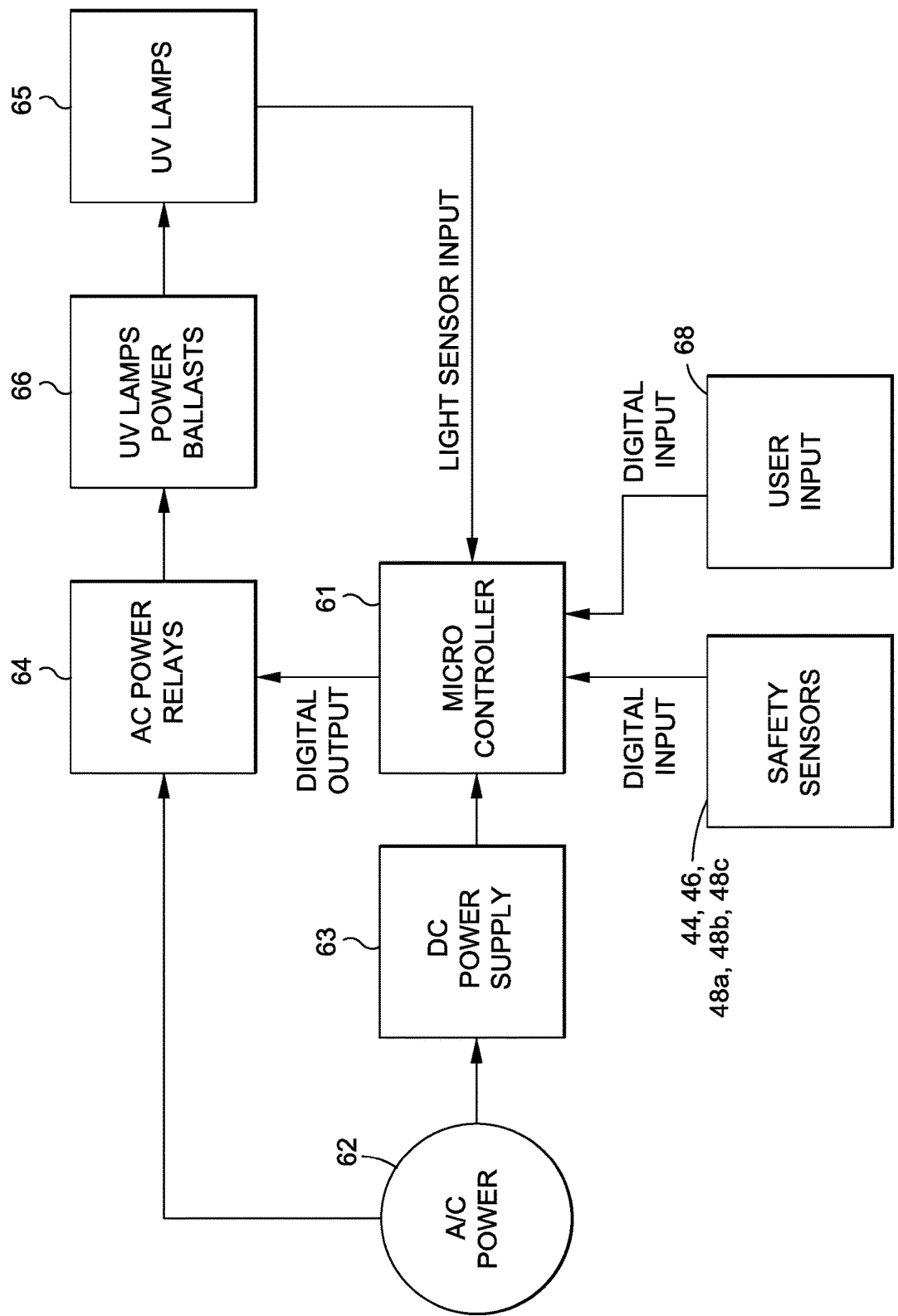
FIG. 7 is a schematic diagram showing a controller for an apparatus according to the present disclosure.

A digital control system for ensuring that the ultraviolet light sources, in the form of fluorescent lamps 65 are activated only under safe conditions is shown schematically in FIG. 7. A microcontroller unit 61 that is coupled to an AC power supply 62 via an AC-to-DC converter 63 receives digital input from position sensors 44, 46, 48*a, b, c, d*. When this input indicates that the receptacle is securely closed and supported firmly on a surface, the microcontroller unit 61 sends out a digital signal energizing a set of AC power relays 64 which in turn energize the lamps 65, via power ballasts 66. Conversely, when the input from the position sensors 44, 46, 48*a, b, c* indicates that the receptacle is open and/or not firmly supported on a surface, the microcontroller unit 61 de-energizes the AC power relays 64, shutting off the ultraviolet lamps 165. Other input to the microcontroller unit 61 includes light or current sensor input from the ultraviolet lamps 165 and user input from a hardwired or wireless interface device 68. The light sensor input indicates when a light source is inoperative, or has met its maximum hours of usage, and needs to be replaced. The interface device 68, which may include switches, levers, knobs, a touch screen, or any other interface devices, allows an operator to select various parameters, such as the length of time the ultraviolet lamps 165 are energized.

Figure 8:
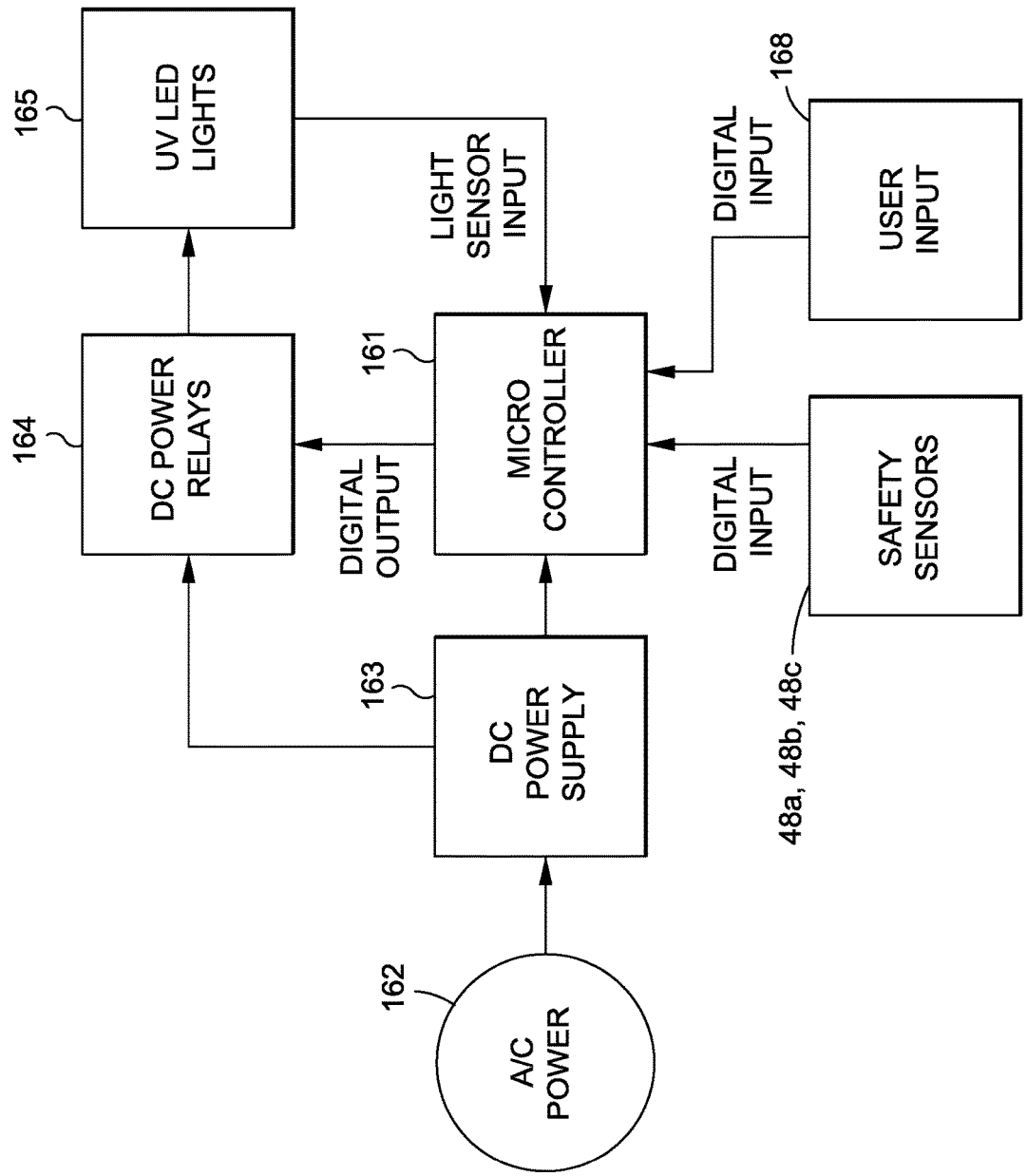
FIG. 8 is a schematic diagram of an alternate embodiment of the controller.

In the alternate embodiment of FIG. 8, a microcontroller unit 161 again receives digital input from position sensors 44, 46, 48*a, b, c, d*, as well as from an interface device 168. However, because the ultraviolet light sources are LEDs rather than fluorescent lamps, they are energized by DC power relays 164 that are coupled to an AC power source 162 via an AC-to-DC converter 63. Otherwise, the control system is identical to the system of FIG. 7.

In other embodiments, analog control schemes could also be used.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus for irradiating plants and produce, comprising:
    at least one ultraviolet light source configured to direct ultraviolet light at a plant or produce; and
    a receptacle configured to hold the plant or produce and to expose the plant or produce to radiation from the ultraviolet light source without allowing the radiated ultraviolet light to escape from the receptacle;
    a power source coupled to the ultraviolet light source and configured to supply power to the ultraviolet light source;
    a receptacle position sensor coupled to the receptacle and configured to detect whether the receptacle is firmly supported on a surface; and
    a controller coupled to the power source and the receptacle position sensor and programmed to prevent the power source from supplying power to the ultraviolet source if the receptacle position sensor does not detect that the receptacle is firmly supported.

2. The apparatus of claim 1, wherein the receptacle comprises:
    a side wall or multiple side walls configured to extend completely around the plant or produce; and
    a solid top wall configured to prevent light from exiting the receptacle.

3. The apparatus of claim 2, further comprising:
    an entry door formed in the receptacle and configured to allow access into the receptacle; and
    at least one lock configured to secure the entry door in a closed position preventing light from escaping from the receptacle during ultraviolet treatment.

4. The apparatus of claim 3, further comprising:
    a door position sensor coupled to the receptacle and configured to detect whether the entry door is closed
    wherein the controller is further programmed to prevent the ultraviolet light source from being energized if the position sensor does not detect that the entry door is closed.

5. The apparatus of claim 2, wherein the receptacle includes:
    a first half-shell having a first edge and a second edge;
    a second half-shell having a first edge and a second edge;
    a hinge connecting the first edge of the first half-shell to the first edge of the second half-shell to allow the half-shells to pivot toward and away from one another; and
    a latch configured to secure the second edge of the first half-shell to the second edge of the second half-shell to lock the shells together in a closed position.

6. The apparatus of claim 5, further comprising:
    a shell position sensor coupled to the receptacle and configured to detect whether the half-shells are locked together in the closed position;
    wherein the controller is further programmed to prevent the power source from supplying power to the ultraviolet light source if the shell position sensor does not detect that the half-shells are locked together.

7. The apparatus of claim 1, further comprising an air blower or fan mounted in the receptacle and configured to blow sufficient air at the plant to cause leaves and other portions of the plant to move, thereby promoting even exposure of the leaves and other portions of the plant to the ultraviolet light.

8. The apparatus of claim 1, wherein the receptacle comprises a reflective interior surface.

9. The apparatus of claim 1, wherein the ultraviolet light source emits ultraviolet rays in the UV-C range.

10. The apparatus of claim 1, wherein the controller is a microcontroller configured to receive digital signals from the receptacle position sensor, and further comprising:
    a power relay located between the microcontroller and the ultraviolet light source and configured to prevent energization of the ultraviolet light source when the receptacle position detector does not detect that the receptacle is firmly supported.

* * * * *